United States Patent [19]

Harada et al.

[11] 3,845,334

[45] Oct. 29, 1974

[54] D. C. MOTOR ARRANGEMENT

[75] Inventors: Hideki Harada; Keitaro Yamashita; Takehiko Sagara, all of Kumagaya; Sadahiro Oyama, Chigasaki; Takamichi Fujitsuka, Tachikawa; Tamotsu Sekino, Chigasaki; Masanori Takanashi, Ichikawa, all of Japan

[73] Assignees: Mitsumi Electric Co., Ltd.; Hitachi Metals Ltd., both of Tokyo, Japan

[22] Filed: Nov. 24, 1972

[21] Appl. No.: 309,485

[30] Foreign Application Priority Data
Nov. 24, 1971 Japan.............................. 46-94256
Feb. 14, 1972 Japan.............................. 47-15354
Sept. 7, 1972 Japan.............................. 47-89693

[52] U.S. Cl.................... 310/46, 310/156, 310/231
[51] Int. Cl.............................................. H02k 1/22
[58] Field of Search............ 310/46, 231, 138, 257, 310/40 MM, 156

[56] References Cited
UNITED STATES PATENTS
2,558,540   6/1951   Clos..................................... 310/46
3,297,891   1/1967   Foran, Jr. ........................... 310/231
3,471,722   10/1969  Hini..................................... 310/219
3,662,196   5/1972   Ruschmann ......................... 310/46

*Primary Examiner*—R. Skudy
*Assistant Examiner*—Harry E. Moose, Jr.
*Attorney, Agent, or Firm*—Armstrong, Nikaido & Wegner

[57]  ABSTRACT

A d.c. motor arrangement is provided which comprises a rotatable magnetic rotor means and a stationary armature means. A plurality of magnetically responsive switching means are positioned radially and circumferentially around the axis of the rotor means for controlling the energization of the armature means. A magnetic means positioned in proximity to the switching means is rotatable about the axis of the rotor means, for operating the switching means. The rotation of the rotor means rotates the magnetic switching means such that it sequentially operates the switching means, thereby energizing the armature means in a predetermined sequence.

4 Claims, 23 Drawing Figures

D. C. MOTOR ARRANGEMENT

BACKGROUND OF THE INVENTION

This invention relates to a d.c. motor arrangement.

A d.c. motor of conventional design employs generally a mechanically operating communication means, preferably comprising commutator elements and a brush. Thus, the d.c. -motor has a rather complicated rotor design in comparison to that of an a.c. -motor.

As a representative example, a rotor rotatably mounted in the housing of the motor is provided with a plurality of coil means, one end of each of these coil means is connected with each of the communtators mounted on the rotor shaft or the like, while the brush is supported in a raised manner on the motor housing and is kept in contact with the commutator elements.

In this kind of prior and representative design of the d.c. motor, the brush and the commutator are kept in mechanical and slidably contact each other, thus sparks are unavoidably generated, accompanied by appreciable noise.

At a high speed running of the motor, the brush will spring up from contact with the commutator; thus the necessary electrical contact may not be made and the smooth running of the motor could be frequently and appreciably inhibited. Wear of the brush and commutator will be encountered frequently and rotational fluctuations are frequently encountered.

SUMMARY OF THE INVENTION

It is therefore the main object of the present invention to provide an improved d.c. -motor arrangement devoid of the aforementioned several drawbacks of the conventional d.c motors.

BRIEF DESCRIPTION OF THE DRAWINGS

This and further objects and features, together with superior advantages of the present invention will become more apparent as the description proceeds by reference to the accompanying drawings illustrative of several preferred embodiment of the invention.

In the drawings:

FIGS. 9, (B) and (D), show a side elevation and an end view of a still further modified arrangement.

DESCRIPTION OF THE PREFERRED EMBODIMENTS

Referring now to the accompanying drawings, several preferred embodiments of the invention will be described in detail hereinbelow.

Figure 1:
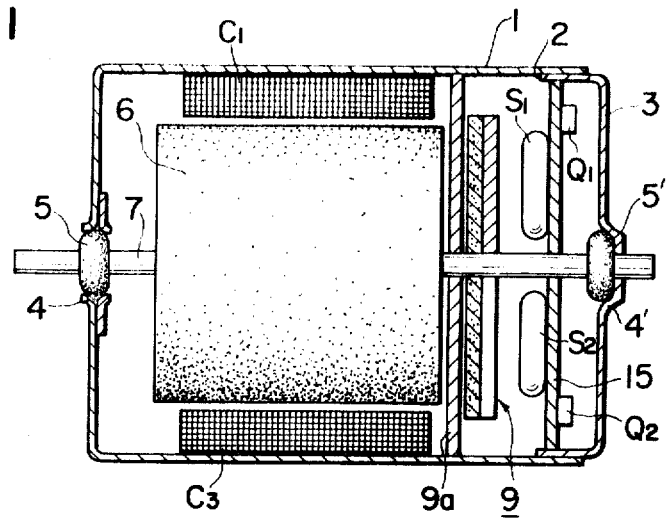
FIG. 1 is a substantially longitudinal section of the first embodiment.

In the first embodiment shown in FIGS. 1-4, numeral 1 represents a hollow cylindrical housing which has a closed left end and an open right end 2 when seen in FIG. 1. A cup-shaped cover 3 is attached to the open end 2 of said housing 1, preferably by utilizing a press fitting technique. Bearings 4 and 4' are provided at the centers of the closed end wall of the housing 1 and of the cover 3, said bearings being provided with respective oilless metals 5 and 5'. A horizontal shaft 7 having rotor 6 fixed thereto passes rotatably through these oilless metals 5 and 5'. The rotor 6 is made of a hard ferrite magnetic material, having a permeability near unity. This rotor 6 is radially magnetized with four poles arranged in a N-S-N-S manner, as shown schematically in FIG. 4 at (B).

Coil means $C_1 - C_5$ are fixed on the inside wall surface of the housing 1 in a radial and concentric arrangement with respect to the rotor 6.

A switching member 9, formed into a circular disc assembly, is fixedly mounted on the shaft 7 in proximity to one end surface of the rotor 6. Between this switching member 9, on the one hand, and the rotor 6 and drive coils $C_1 - C_5$, on the other, a separating wall $9a$ is provided which is fixedly attached to the housing 1, said wall $9a$ acting as a magnetic shield, as will be described later more fully hereinafter.

Figure 2A:
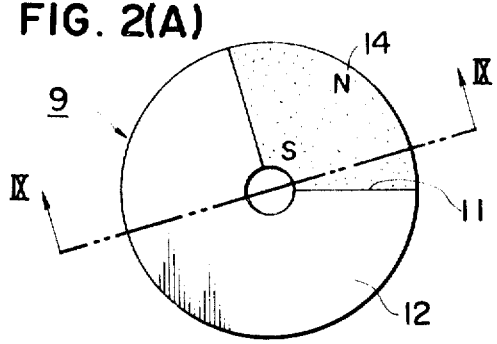
FIG. 2, (A) and (B) represents a front view as well as an elevational section of a magnetically operating switching member employed therein.
Figure 2B:
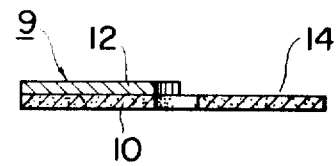

The switching member 9 comprises two mutually overlapped and fixed disc elements 10 and 12. The first disc element 10 is wholly made of a ferromagnetic material, such as hard ferrite, while the second disc element 12 is made of a ferromagneti material, such as pure iron, and formed with a large sector-shaped notch 11 having a central or included angle of 108 degrees, as schematically shown at (A) in FIG. 4. The part of the first element 10 which fully covers said notch 11 is magnetized radially to represent magnetic poles N and S, as shown in FIG. 2 (A) By this construction, the magnetized sector at 14 is sharply defined from the remaining area of the first element 10.

Figure 3:
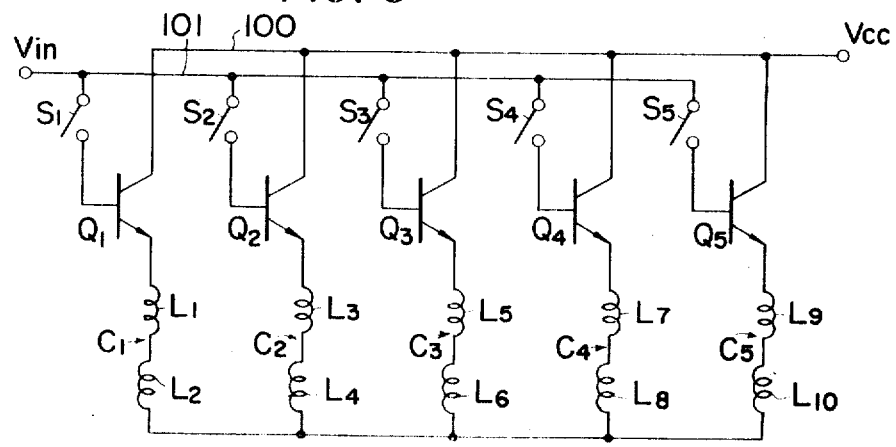
FIG. 3 is an electric circuit employed in the first embodiment.

Each of the drive coil means $C_1 - C_5$ consists of two coil elements $L_1;L_2$, $L_3;L_4$, $L_5;L_6$, $L_7;L_8$ and $L_9;L_{10}$, respectively. Each pair of these coil elements are connected electrically in series with each other, as shown in FIG. 3. Numeral 15 represents a base plate which is mounted fixedly in the interior of the housing 1, said plate 15 being provided on its one face with a series of radially arranged lead switches $S_1 - S_5$ around the shaft 7 as a center, so as to magnetically cooperate with the switching and magnetized sector 14, while, on the opposite surface of the plate 15, a series of amplifier transistors $Q_1 - Q_5$ are fixedly and radially mounted. As seen especially from FIG. 3, lead switches $S_1 - S_5$ are electrically connected with respective transistors $Q_1 - Q_5$.

Figure 4A:
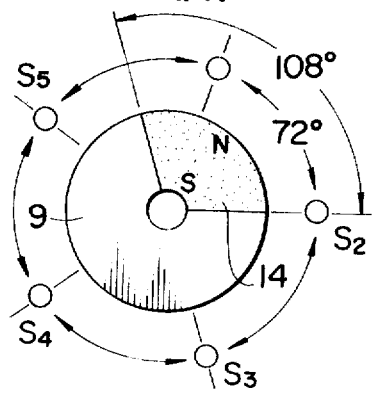
FIG. 4, (A) and (B) represent explanatory diagrams for the illustration of the operational principle of the first embodiment.
Figure 4B:
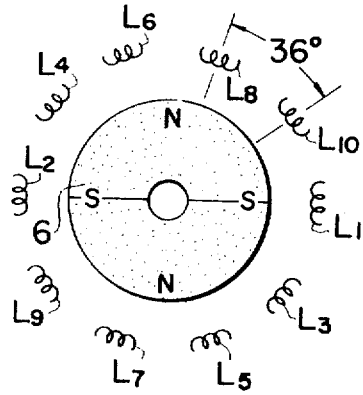

These drive coils $C_1 - C_5$, lead switches $S_1 - S_5$ and transistors $Q_1 - Q_5$ are connected with each other as shown in FIG. 3 in such way that a certain predetermined voltage, say 12 volts, is applied to the collector electrodes of the transistors $Q_1 - Q_5$ from a voltage source Vcc, not specifically shown. Between the emitter electrodes of the amplifier transistors $Q_1 - Q_5$, and ground respective drive coil means $C_1 - C_5$ are inserted. Each respective pair of the coil elements, $L_1;L_2$, $L_3;L_4$, $L_5;L_6$, $L_7;L_8$ and $L_9;L_{10}$ are arranged diametrally opposite to each other and each two neighboring coil elements are arranged at a spacing angle of 36°, as shown in FIG. 4(B). The concentrically arranged lead switches $S_1 - S_5$ have a constant spacing angle of 72° as shown in FIG. 4(A).

The operation of the first embodiment of the d.c. motor arrangement so far shown and described is as follows:

At first, a certain constant voltage, say 5 volts, is applied to input terminal Vin from a certain voltage source, not shown, which input voltage is conveyed through input lead 101 to the respective lead switches $S_1 - S_5$.

At the same time, a second constant input voltage, 12 volts in this case, is applied to the input terminal Vcc and conveyed through lead 100 to the respective collector electrodes of transistors $Q_1 - Q_5$.

It is now assumed that the magnetized sector 14 is positioned in axial registration with the first lead switch $S_1$. Thus, this lead switch $S_1$ is magnetically operated to its on-position. Thus, an amplified current is supplied from the transistor $Q_1$ to the related coil means $C_1$, the first coil element $L_1$ of which occupies at this stage a 72° clockwise advanced position relative to the related lead switch $S_1$ as shown in FIGS. 4(A) and 4(B)

Since the first coil element $L_1$ is provide as commonly known with a stator core, nowt shown, and the winding direction of the coil element is so selected that a S-pole induced in the core is directed towards the rotor, the related S-pole on the rotor and that of the related stator will repel each other and the rotor will rotate in clockwise direction when seen in FIG. 4(B). With simultaneous energization of the second coil element $L_2$ which is provided with a stator core the N-pole of the stator is directed towards the corresponding N-pole on the rotor at this operational stage and, the clockwise rotation of the rotor is enhanced thereby.

With slight clockwise rotation of the rotor, the next following N-pole will be attracted magnetically by the S-pole of first coil element $L_1$, and thus, the rotation of the rotor is maintained. At the same time, the S-pole on the rotor which is positioned at the lowest point in FIG. 4(B) is attracted by the N-pole of second coil element $L_2$ and the rotational movement of the rotor is ehanced in its rotating direction.

With this rotation of the rotor, accompanying the switching member 9, the magnetized sector 14 will move in unison, thus the first lead switch is magnetically operated to its off-position. With the sector 14 positioned in radial registration with the second lead switch $S_2$, the latter is now magnetically operated to its on-position. Thus, current will flow through the second drive coil means $C_2$ which comprises third and fourth coil elements $L_3$ and $L_4$.

With energization of these coil elements $L_3$ and $L_4$ which are provided equally with stator cores, not shown, having S-pole and N-pole towards the rotor, respectively, similar magnetic repelling is brought about between the rotor poles S and N, and the core poles N and S, for accelerating and maintaining the rotational movement of the rotor. This magnetic repelling action is followed by a magnetic attraction acting between the rotor and the drive coil elements $L_3$ and $L_4$ in the similar manner as described above, and so on.

The magnetic on-off control of the next following coil means $C_3$, $C_4$ and $C_5$ by the rotating switching member 9 will be equally and successively brought about, and successive rotational acceleration is applied magnetically to the rotor by the on-off control of the successive coil means $C_3$, $C_4$ and $C_5$.

Although the base plate 15 has beenn shown and described as if it were stationary, in practice, this plate 15 is adjustable in its circumferential position, or more specifically, it is mounted rotatably with a friction fit. When the rotor 6 is desired to rotate in the reverse or counter clockwise direction when seen in FIG. 4(B), the base plate 15 is adjusted to shift in clockwise direction in FIG. 4 by 72° so that the fifth switch $S_5$ is shifted from the position shown in FIG. 4(A) to that of the first switch $S_1$ shown therein. Other switches are also simultaneously shifted by the said angle 72° in unison, so as to bring the fifth switch $S_5$ into its on-position in preference at the initiation stage of the rotor rotation.

With the fifth switch $S_5$ operated to its on-position, fifth drive coil means $C_5$ is the energization as before. With energized of the tenth coil element $L_{10}$, having its N-pole directing towards the rotor, the left S-pole on the rotor (FIG. 4, (B) ) is attracted by the said N-pole on the core of the coil element $L_{10}$. This initiates counter clockwise rotation, and so on.

Although not shown, the sector space 11 can be filled with non-magnetic material, say stainless steel, having the same or similar specific gravity as that of the material of the disc element 10, so as to eliminate possible rotational unbalance of the disc assembly 9.

Next, referring to FIGS. 5–9, the second embodiment of the present invention will be described in detail hereinbelow.

In this second embodiment, there is provided a rotor 20 which is similar in its structure and function as those of the foregiong rotor 6. This rotor 20 is fixedly mounted on its shaft 7' which is arranged and mounted in the similar way as that of the foregoing shaft 7 and rotatably mounted in a housing 24 similar to that of the foregoing embodiment as shown at 1.

In the foregoing first embodiment, the switching member 9 formed into a disc assembly was mounted on the rotor shaft 7 and separated from the rotor. However, in the present embodiment, a similar switching member is united intimately with the rotor 20 and provided directly on the right-hand end surface thereof when seen in FIG. 5. The rotor 20 is made again of ferromagnetic material and radially magnetized in the commonly known four pole mode so as to represent four magnetic poles N-S-N-S as shown only by "N" and "S" on the rotor peripheral surface 20a.

A magnetically shielding disc 23 having a large sector notch 22 is fixedly attached on the end surface of the rotor by glueing or the like conventional attaching means. The related rotor end portion which fully covers the notch 22 is additionally magnetized in the two pole mode, as represented by "N" and "S" shown in FIG. 8(A). It will be seen that a sharply defined magnetized end area portion corresponding to the sector notch 22 is exposed to outside, as shown by reference numeral 21. This magnetized sector 21 is adapted for magnetic cooperation with lead switches $S_1' - S_8'$, in the similar way as before. The sector has a predetermined central or included angle of 75° in the present specific embodiment. The shielding disc 23 is made of a ferromagnetic material, preferably pure iron.

Base plate 25 is provided in the similar way as at 15 in the first embodiment. This plate 25 is attached with lead switches $S_1' - S_8'$ and amplifier transistors $Q_1' - Q_4'$ as before.

Drive coil means $C_1' - C_4'$ consist respectively of pair of coil elements $L_1';L_2'$, $L_3';L_4'$, $L_5';L_6'$ and $L_7';L_8'$.

Figure 7:
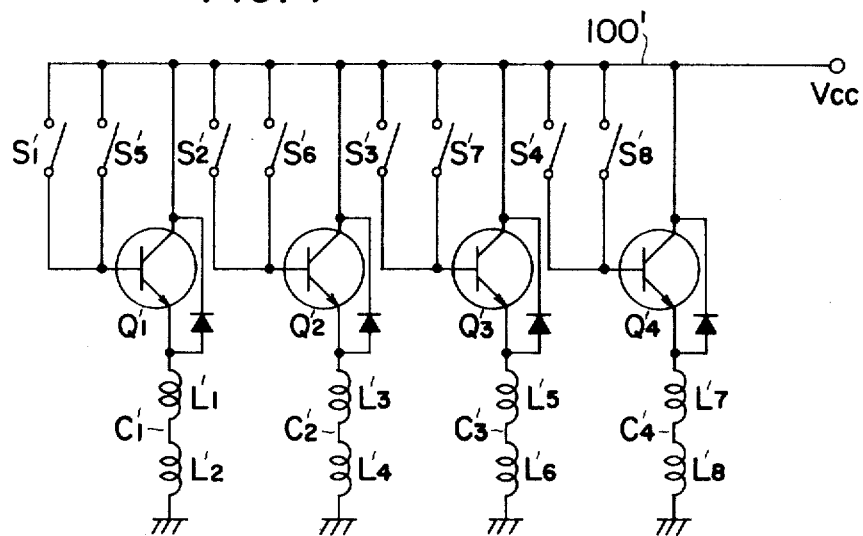
FIG. 7 is a similar view to FIG. 3, illustrative of the electric circuit employed in the second embodiment.

All the aforementioned circuit elements are connected electrically with each other as shown in FIG. 7. These connection modes will become more clear when reading the following description of function of the present embodiment. Lead 100' corresponds to 100 in the foregoing.

Figure 8A:
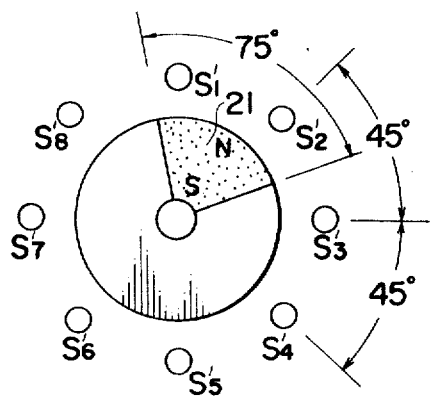
FIG. 8, (A) and (B), are explanatory views for the demonstration of the operational principle of the second embodiment.
Figure 8B:
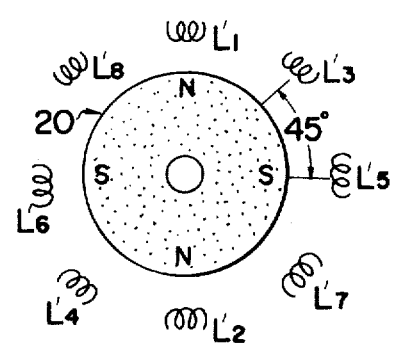

In the present embodiment, when the magnetized sector 21 is positioned relative to the lead switches $S_1'$ and $S_2'$ as shown in FIG. 8(A) these switches are magnetically operated to close so that amplified current may flow through both coil means $C_1'$ and $C_2'$. As a result, coil elements $L_1' - L_4'$ are energized to rotate the rotor in clockwise direction when seen in FIG. 8(B) in a substantially similar manner as before. Therefore, the driving torque may be doubled in comparison with the foregoing embodiment.

By arrangement of the switching member or magnetized sector united with the rotor, the whole arrangement is highly simplified and compacted.

A substantially improved balance of the rotational member is additionally attained.

Figure 9A:
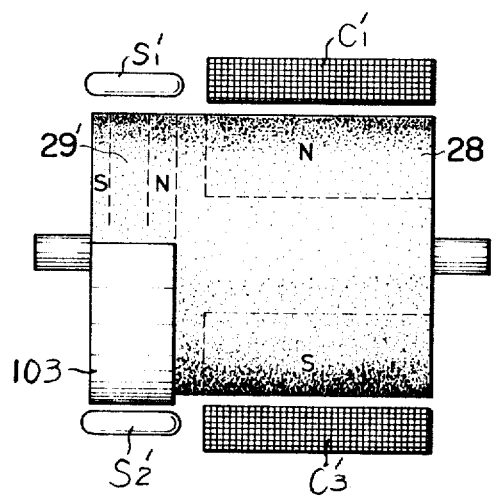
FIGS. 9, (A) and (C) show a side view and an end view of a slight modification of the second embodiment.
Figure 9C:
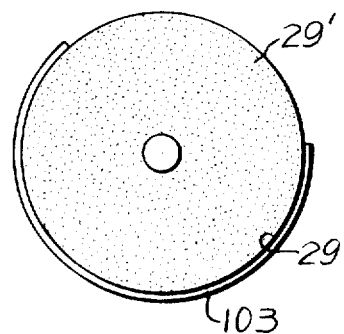

In FIG. 9(A), a slight modification from the foregoing second embodiment is shown. In this modification, the rotor has been divided into a main portion 28 and an end portion 29. The main portion is designed in the same manner as before to cooperate with radially arranged drive coil means $C_1'$, $C_3'$ and the like shown in FIG. 5 in the foregoing. The end portion 29 is covered with an open shield ring 103, so as to provide a magnetized sector 29' seen in the radial direction of the rotor. This sector portion 29' has been energized radially so as to represent two parallel N-pole and S-pole strips as shown. The magnetic flux emantes from the N-pole strip and returns to the S-pole strip. When the rotor is so positioned that the lead switch switches $S_1'$ or $S_2'$ are influenced by the magnetic flux at the sector portion 29', it is kept open to allow electric current to pass therethrough.

Figure 9B:
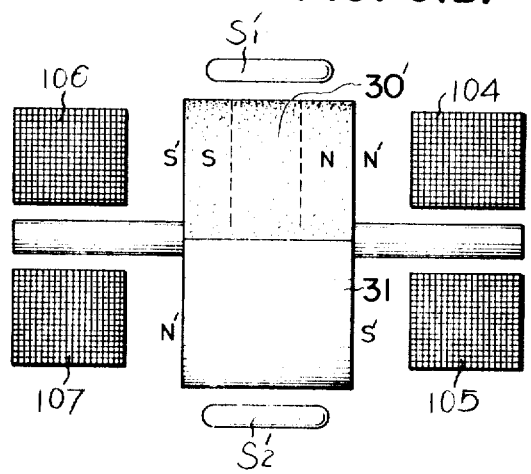
Figure 9D:
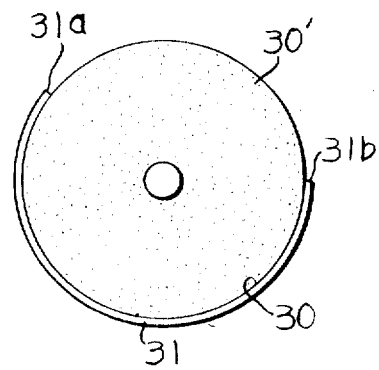

A still further modification from the first modification shown in FIG. 9(A) is shown in FIG. 9(B).

In the present further modification, the end portion 29 in the foregoing has been enlarged to the whole of the rotor. Therefore, an open shield ring 31 is used which has a wide corresponding to the axial length of the rotor. Between the both end edges 31a and 31b, a magnetized sector portion 30' is formed. In the similar way as before, there are two parallel N-pole and S-pole strips as shown. When the rotor is so positioned that either the lead switch $S_1'$ or $S_2'$ shown only as representatives is influenced by the magnetic fluxes at the sector portion 30', it is kept open as before.

With the energization of any one or more of the drive coils 104 – 107 and by magnetic cooperation of the thus energized coil(s) with magnetic poles only representatively shown at N' and S' which have been formed by axially and localized energization of the rotor material, the rotor can be rotated as before. As the drive and control circuit, similar arrangement as shown in FIG. 3 or 7 can be adopted. This will apply to the arrangement shown in FIG. 9(A).

Finally, referring to FIGS. 10 – 14, the third embodiment of the invention will be described hereinbelow in detail.

Figure 5:
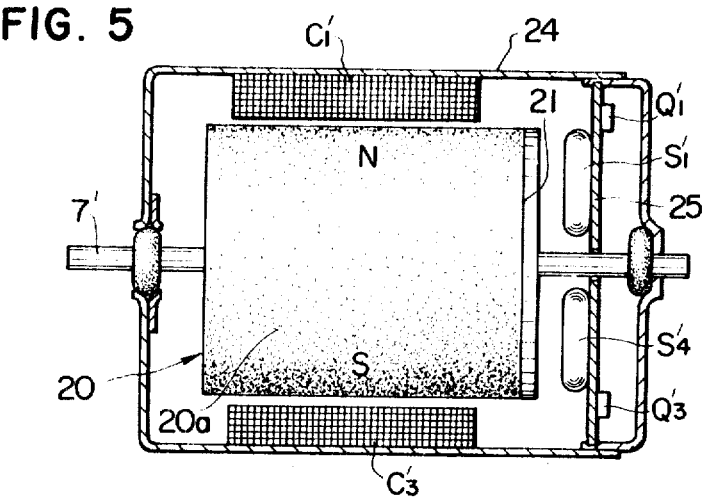
FIG. 5 is a similar view to FIG. 1, illustrative of the second embodiment of the invention.
Figure 6A:
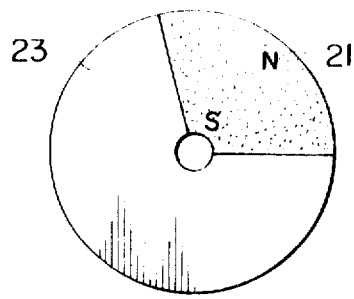
FIG. 6, (A) and (B), are explanatory front views of the switching member and the shield member employed in the second embodiment.
Figure 6B:
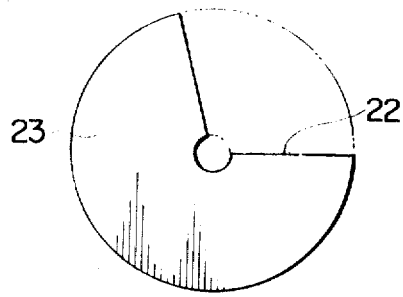

In this third embodiment, numeral 40 represents a rotor which is similar in its design and function as that shown at 20 in FIG. 5. This rotor 40 is fixedly mounted on its shaft 49 which is arranged and mounted in the similar way as that of the foregoing shaft 7 and rotatably mounted in a housing 41 similar to that of the foregoing first embodiment as shown at 1.

Figure 10:
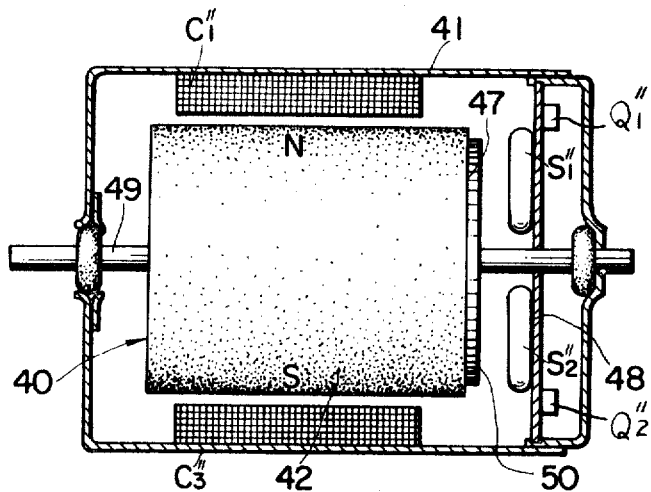
FIG. 10 is a similar view to FIG. 1, illustrative of the third embodiment.
Figure 11A:
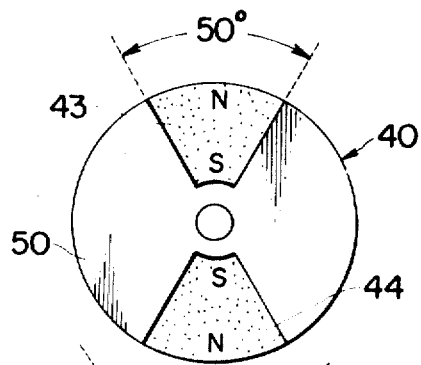
FIG. 11, (A) and (B), show schematic explanatory views of a switching member and a shield member adopted in the third embodiment.
Figure 11B:
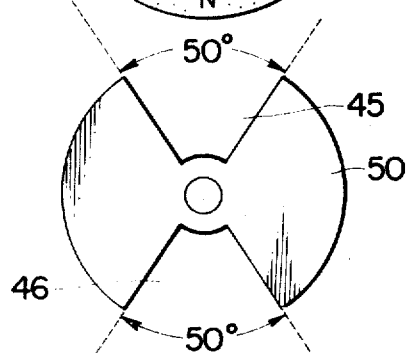

The rotor surface 42 represents four poles N-S-N-S of which only two are shown in FIG. 10. On the interior wall surface of the hollow cylindrical housing 41 which is similar to that shown at 24 in FIG. 5, four drive coils $C_1'' - C_4''$ (FIG. 12) are fixedly mounted, although only two of which are shown at $C_1''$ and $C_3''$.

A magnetic shielding disc 50 is fixedly attached to one end surface of said rotor 40 similar as in the case of FIG. 5. This disc 50 is formed oppositely with a pair of sector-shaped large notches 45 and 46, each of the latter having a central or included angle of 50°. The portions of the rotor end which are fully covered by these notches are radially energized to represent each a pair of opposite magnetic poles "N" and "S", the "N"-poles being arranged at outer positions with respect to the "S"-poles. By this structure, a pair of radially oposite, magnetized sectors 43 and 44 are formed on the related rotor end surface shown at 47.

Figure 12:
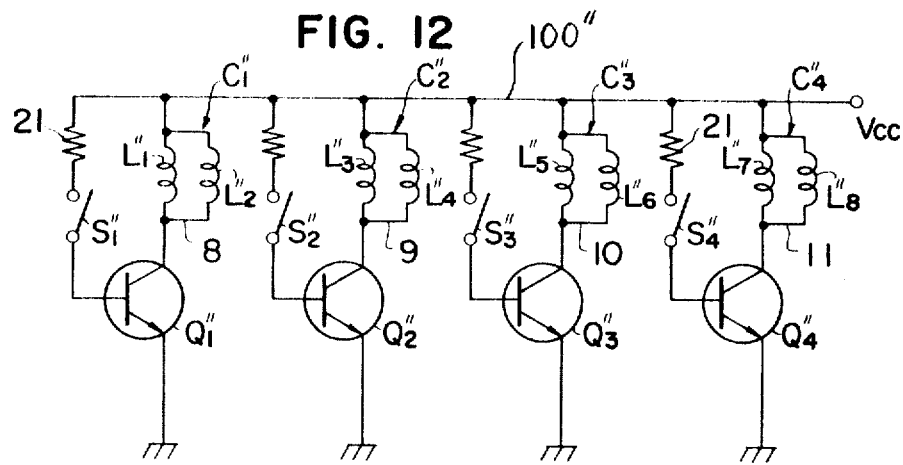
FIG. 12 is a similar view to FIG. 3, showing the electric circuit employed in the third embodiment.
Figure 13A:
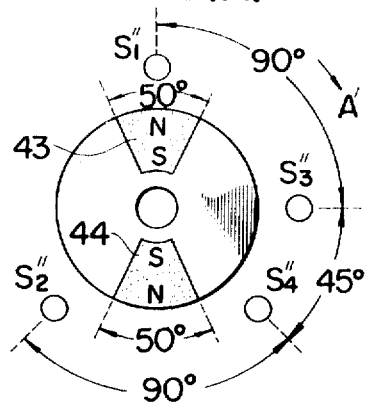
FIG. 13, (A) and (B) show explanatory views illustrating the working principle of the third embodiment.
Figure 13B:
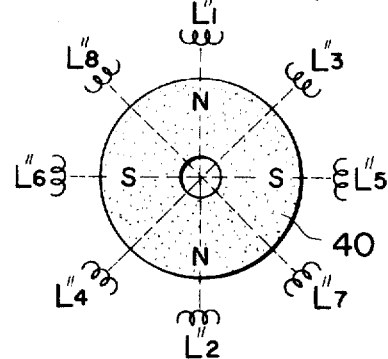
Figure 14:
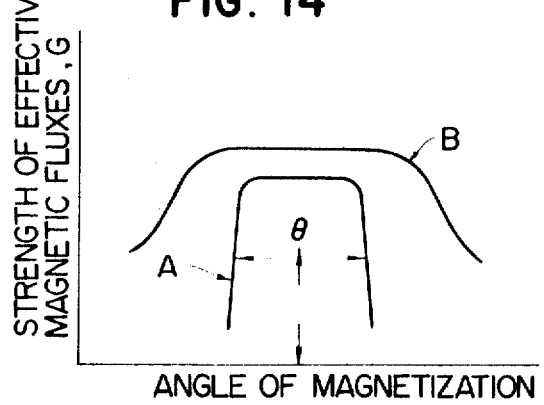
FIG. 14 is a comparison diagram of the operational efficiency between the conventional and the improved and inventive designs of the d.c. -motor.

Base plate 48 is only heavily frictionally rotatable within the interior of the housing 41 and mounts in turn on its inner surfaces a plurality of lead switches $S_1'' - S_4''$ arranged radially around the rotor shaft 49 for cooperation with switching magnetized sectors 43 and 44. On the opposite surface of the base plate 48, a plurality of amplifier transistors $Q_1'' - Q_4''$ are fixedly mounted, the base electrodes thereof being electrically connected with respectively lead switches $S_1'' - S_4''$, as schematically shown in FIG. 12.

Coil means $C_1'' - C_4''$ consist respectively of a parallel combination of respective coil elements $L_1'';L_2''$, $L_3'';L_4''$, $L_5'';L_6''$ and $L_7'';L_8''$, as shown.

The emitter electrodes of these transistors $Q_1'' - Q_4''$ are grounded, while the collector electrodes thereof are electrically connected with the respective coil means $C_1'' - C_4''$ which are connected in turn with a lead 100'' extending to input terminal Vcc. Between the lead switches $S_1'' - S_4''$ and the lead 100'', respective resistors 21 are inserted as shown.

The operation of the third embodiment is as follows.

It is firstly assumed that the lead 100'' is impressed with an input voltage as before. It is further assumed that the rotor 40 is so positioned that the first switching sector 43 is in axial and separated registration with first lead switch $S_1''$. Then, this switch $S_1''$ is operated magnetically as before to close. With closure of this lead switch, current flows in a direction through drive coil $C_1''$ which has a stator core, not shown, such that the N-pole is thereby established towards the corresponding N-pole on the rotor. In this manner and as in the similar way as before, a magnetic repelling force is generated for rotating the rotor in clockwise direction when seen in FIG. 13.

An intentional reversed rotation of the rotor can be effected in the similar way as was referred to hereinbefore.

The merit obtainable by an increase of the number of switching sectors resides in that the number of the necessary lead switches can be correspondingly increased.

By the specific arrangement of d.c. motor arrangement as so far shown and described, the magnetized switching sector is sharply defined in its configuration and the of-off switching of the lead switches employed can be sharply and positively executed, which leads to a smooth and accurate operation of the motor.

FIG. 15 represents a comparative tests. Curve "A" represents the inventive motor, while curve "B" represents regular and similar motor in which lead switches are on-off controlled by the commonly known magnetic means without being fitted with magnetic field-sharply defining means as proposed by the present invention.

The embodiments of the invention in which an exclusive property or orivilege is claimed are as follows:

1. A dc motor comprising:
   a. rotatable magnetic rotor means;
   b. stationary armature means;
   c. a plurality of magnetically responsive switching means positioned radially and circumferentially around the axis of said rotor means, for controlling the energization of said armature means; and,
   d. magnetic means positioned in proximity to said switch means and rotatable about the axis of said rotor means, for operating said switching means wherein the rotation of said rotor means rotates said magnetic means such that said magnetic means sequentially operates said switching means thereby energizing said armature means in a predetermined sequence, said magnetic means comprising the end face of said rotor means and a shield means covering a portion of said end face of said rotor means for shielding the switching means from the magnetic field of the covered portion of said rotor means wherein said switching means are operated only by the portion of said rotor means which is not shielded by said shield means.

2. The motor of claim 1 wherein said shield means is fixed to the end of said rotor means.

3. A dc motor comprising:
   a. rotatable magnetic rotor means;
   b. stationary armature means;
   c. a plurality of magnetically responsive switching means positioned radially and circumferentially around the axis of said rotor means for controlling the energization of said armature means; and,
   d. magnetic means positioned in proximity to said switch means and rotatable about the axis of said rotor means, for operating said switching means wherein the rotation of said rotor means rotates said magnetic means such that said magnetic means sequentially operates said switching means thereby energizing said armature means in a predetermined sequence, said magnetic means comprising the end portion of said rotor means and shield means, surrounding a portion of the end portion of said rotor means, for shielding said switching means from the magnetic field of the portion of the end portion of said rotor means wherein said switching means are only operated by the portion of the end portion of said rotor means which is not shielded by said shield means.

4. A dc motor comprising:
   a. rotatable magnetic rotor means;
   b. stationary armature means;
   c. a plurality of magnetically responsive switching means positioned radially and circumferentially around the axis of said rotor means, for controlling the energization of said armature means; and,
   d. magnetic means positioned in proximity to said switch means and rotatable about the axis of said rotor means, for operating said switching means wherein the rotation of said rotor means rotates said magnetic means such that said magnetic means sequentially operates said switching means thereby energizing said armature means in a predetermined sequence, said magnetic means comprising said rotor means and shield means, surrounding a portion of said rotor means in the axial and circumferential directions for shielding said switching means from the magnetic field of said rotor means wherein said switching means are only operated by the portion of said rotor means which is not shielded by said shield means.

* * * * *